A. HEYLAND.
POLYPHASE DYNAMO AND MOTOR.
APPLICATION FILED JUNE 1, 1914.

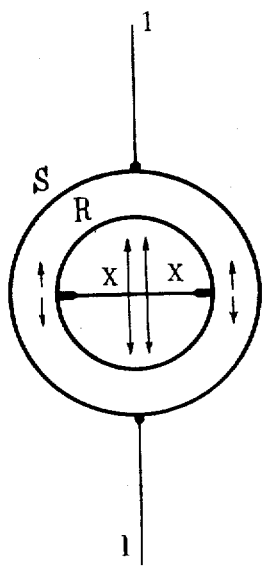
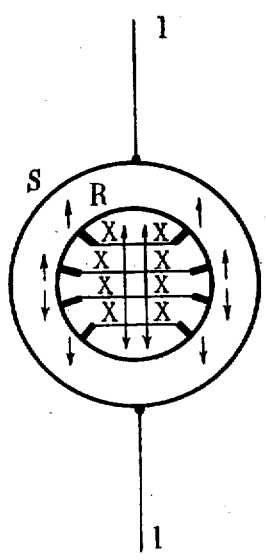
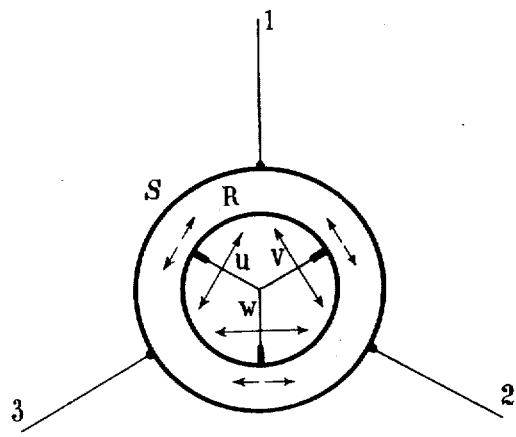

1,411,354.

Patented Apr. 4, 1922.
2 SHEETS—SHEET 2.

UNITED STATES PATENT OFFICE.

ALEXANDER HEYLAND, OF BRUSSELS, BELGIUM.

POLYPHASE DYNAMO AND MOTOR.

1,411,354.    Specification of Letters Patent.    Patented Apr. 4, 1922.

Application filed June 1, 1914. Serial No. 842,170.

(GRANTED UNDER THE PROVISIONS OF THE ACT OF MARCH 3, 1921, 41 STAT. L., 1313.)

*To all whom it may concern:*

Be it known that I, ALEXANDER HEYLAND, engineer, subject of the German Emperor, residing at Brussels, Belgium, 96 Rue de Stassart, have invented certain new and useful Improvements in Polyphase Dynamos and Motors, (for which I have filed applications in Germany June 14, 1913, Patent No. 269,307, and April 1, 1914,) of which the following is a specification.

My invention relates to improvements in polyphase dynamos and motors.

Single phase repulsion motors are known, which have brushes short-circuited monoaxially in relation to the field, and are started and regulated by regulating the field or by rotating the field or brushes. Besides having other advantages these motors are simple both as regards construction and control, and for this reason they have been used in polyphase systems for large outputs, by dividing a three phase current on the Scott principle into two single phase currents and using two coupled single phase repulsion motors instead of a single motor.

Also known are various kinds of single phase commutator motors with two bi-axial sets of brushes, one set either in the main axis, or in an axis perpendicular or inclined thereto, being short circuited or closed upon itself over a low pressure exciter, and the other one being used as a revolution regulator and arranged in a circuit in which the pressure and current are variable within wide limits.

This method cannot be directly adopted with polyphase commutator motors, owing to the stator winding producing a field in various directions.

If the armature of a polyphase commutator motor were short circuited over two brushes, the latter would lie neutral to one axis, but in the axis perpendicular thereto they would directly short circuit the coils furnishing the ampere turns. The result would be exactly the same as if the armature of a polyphase induction motor were short-circuited over two slip rings instead of three, and although these motors can be started they have not the same advantages as single phase repulsion motors.

If the armature of a polyphase commutator motor is short circuited over three brushes, this is in principle identical with a short circuit over three slip rings with a polyphase induction motor. In both cases resistances are required for starting. Such motors are also termed three phase repulsion motors, but they certainly have not the qualities of single phase repulsion motors. On the other hand repulsion motors for polyphase current are known. It has been endeavoured to endow these motors with the qualities possessed by single phase repulsion motors by dividing the poles of the machine into pairs which are entirely independent of each other, so that to some extent each pair of poles represents an independent single phase repulsion motor. Motors based on this principle are of no practical value.

The present invention is based on the discovery that it is possible with polyphase commutator motors, especially with a suitable form of winding, and without dividing the poles of the machine into pairs, to obtain essentially the same advantages as those associated with single phase repulsion motors, this being effected by short circuiting the brushes in pairs, in axes varying according to the number of phases, the distance between the brushes, measured on the commutator circumference differing by a certain angle from the angular distance between the axes of the several phases of the stator winding.

Various applications of this principle are shown in the accompanying drawings in which—

Figures 1 and 2 are diagrams of single phase repulsion motors in zero position.

Figure 3 is a bipolar diagram of a three phase commutator.

Figures 1 and 2 in the first instance are diagrams for single phase repulsion motors in the zero position, Figure 1 showing a simple brush set which short circuits the armature in the direction indicated by the arrows $x, x$. In Figure 2 there are four parallel brush sets which short circuit the armature in the same direction, as shown by arrows $x, x$. The circle S shown by a thick line represents the stator winding with the single phase leads I, I; R is the rotor winding or its commutator with the brushes shown inside.

The field is indicated by the two arrows inside the rotor and induces in the two armature halves voltages of equal size and opposite in phase, as indicated by the small arrows shown outside the rotor, and which in the position shown neutralize each other at opposite sides of the brush axis. If such motors are started, for instance, by turning the brushes, the currents induced between the brushes will in the first instance simply cause the field axis to rotate, the vertical component of the same being determined by the stator winding.

The principle of the repulsion motor is based on the mono axial component of the stator field, peculiar to the single phase motor and the mono-axial short circuit of the rotor.

Figure 3 shows the bipolar diagram of a three phase commutator motor with the three leads 1, 2, 3 and triaxial short circuit of brushes on axes $u$, $v$, $w$. If the short circuit were mono-axial as is the case with the above mentioned single phase motors, the field would be short circuited in one axis and not in the axis perpendicular thereto. With these triaxial short circuits however there can be no appreciable armature field when the motor is at rest. Even assuming the motor to be so wound that the axes of the stator coils as in the position shown, do not coincide with the brushes, the field will be annulled, with the brushes in any position by the short circuit currents over the brushes. In this case the field in the rotor would have to have alternately the direction shown by the arrows inside the rotor, forming a triangle, and would create in the separate halves of the shunt circuits, tensions of different phases, indicated according to their phase by the small arrows shown outside the rotor. These phases always combine to form components which lie in the direction of the short circuit between each pair of brushes and which short-circuit the armature in all directions, so that the armature has the same action as the short circuit armature of an induction motor, and an armature field cannot occur when the armature is stationary.

Figure 4:
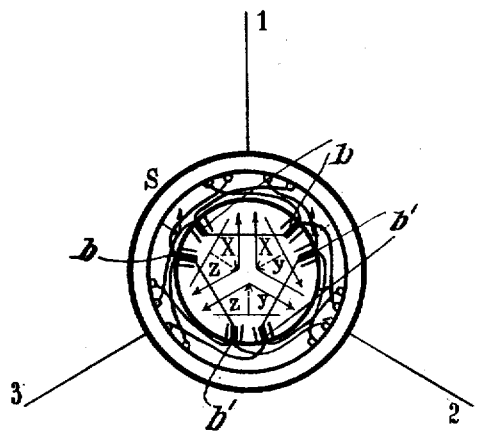
Figure 4 shows a brush arrangement.
Figure 5:
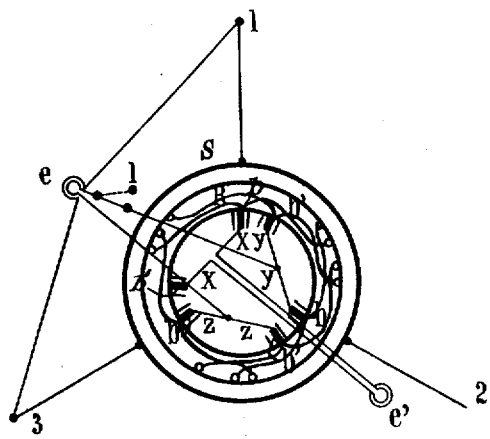
Figure 5 shows the adjustment of the brushes.

According to my invention an effect similar to that in single phase repulsion motors is obtained by using a rotor having a chord winding with brushes on a commutator which is connected to the winding in the usual way, adjacent brushes being connected in pairs across chords of the commutator in different axes according to the number of phases, said brushes being short circuited as indicated in Fig. 4 or being connected by a circuit of low tension as indicated in one of the pairs of brushes in Fig. 5, said brushes of any connected pair bearing on parts of the commutator whose angular distance apart is greater or less than the angle between the axes of the several phases of the stator winding.

Figure 4 shows an arrangement of the brushes for carrying out the method of operation just described, the brushes $b$ and $b'$ being connected in three pairs in the $x$, $y$ and $z$ axes, the distance between the brushes being somewhat less than the angle between the phases of the stator.

In this case again, assuming there to be a three phase stator winding with short coils overlapping each other to the extent of ⅔ of the pitch of the poles, the field produced by the stator would be represented by the vectors arranged in a triangle. In this case, however, it will be seen that the currents induced in the short circuits $x$, $y$, $z$ must produce at the unoccupied places a field as indicated by the arrows shown in broken lines, and this field will so overlap the field originally produced by the stator that a mono-axial field as indicated by the arrows in full lines will exist between each pair of brushes, in exactly the same manner as the single axial field in the single phase repulsion motor.

In the zero position shown in Fig. 4 only a weak magnetizing current flows between the brushes, this current just sufficing to produce the correcting field indicated by the arrows shown in broken lines. In this case, the major portions of the voltages generated in the chords subtended by any pair of short circuited brushes are neutralized as indicated by the arrows within the rotor shown in Fig. 3.

The effect described is obtained, as stated, by using on the rotor a chord winding producing on the circumference of the rotor a current distribution in which successive short circuit phases are superimposed. A normal drum winding would give a distribution such as, for example, a normal polyphase winding with star connection, and does not produce the same effect. The two halves of each coil are in that case always diammetrically apart, that is to say, 180° in the electrical sense and if the winding were short circuited over three brushes, the rotor would always be short circuited upon itself in three axes, however close the brushes are, and there could be no large useful field. This is shown in Fig. 3.

The stator S is shown diagrammatically only since any known or convenient form of polyphase winding may be employed thereon. However, I prefer to wind the stator so that its coils combine or overlap in a manner similar to those of the rotor.

Figure 5 shows the adjustment of the brushes during starting or when running.

The brushes may for instance be adjusted as a whole, so that Figure 4 becomes similar to Figure 5, or the brushes $b$ may be fixed for mono-phase current as in the Déri-motor, only the brushes $b'$ being adjusted as indicated by the legend on Fig. 4. Any other known method of adjusting the brushes now in use with or which may be found convenient for use with single phase motors may also be used.

From the foregoing it will be understood that the flux caused by the stator may be considered as passing at any given maximum from a pole at the inner end of the stator lead 1 (Figures 4 and 5) to poles at the inner ends of stator leads 2 and 3. This flux of course, will pass in a curved line in the usual manner through the chords or portions of the rotor bounded by radii passing through the inner ends of the stator leads. The flux just mentioned must consequently pass through the chords of the rotor winding subtended by two of the pairs of brushes on the rotor, passing into the chord on one side of the line connecting the brushes and out of said chord on the other side of said line. There will thus be set up in the two excited sections or chords of the rotor winding monophase alternating fluxes the axes of which are at right angles to the lines connecting the brushes of each pair. These rotor fluxes are thus at a large angle to the direction of the stator flux, thus providing a magnetic reaction causing a starting torque independent of the rotating effect of the stator field.

The brushes, instead of being short circuited, may be closed over a transformer $e^1$ so that a certain amount of compensation exists even when the motor is running as a repulsion motor at a certain speed, this being shown in Figure 5 for phase 2 only, for the sake of clearness.

Having now particularly described and ascertained the nature of my said invention and in what manner the same is to be performed, I declare that what I claim is:—

1. A polyphase commutator dynamo or motor, comprising in combination. a rotor, a chord winding on the rotor, a commutator and brushes on the commutator, connected in pairs in different axes according to the number of phases adjacent brushes being connected, said brushes bearing on parts of the commutator whose angular distance apart measured around the commutator periphery differs from the angle between the axes of the several phases of the stator winding, substantially as described.

2. A polyphase commutator dynamo or motor, comprising in combination, a rotor, a chord winding on the rotor, a commutator and brushes on the commutator, in pairs in different axes according to the number of phases and connected by circuits of low tension, said brushes bearing on parts of the commutator whose angular distance apart measured around the commutator periphery differs from the angle between the axes of the several phases of the stator winding.

In testimony whereof I have hereunto set my hand in presence of two subscribing witnesses.

ALEXANDER HEYLAND.

Witnesses:
CHARLES A. JOHNSON,
CHAS. ROY NASMITH.